US008533318B2

(12) United States Patent
Chambers et al.

(10) Patent No.: US 8,533,318 B2
(45) Date of Patent: Sep. 10, 2013

(54) PROCESSING AND PRESENTING MULTI-DIMENSIONED TRANSACTION TRACKING DATA

(75) Inventors: Graeme Stanley Chambers, Perth (AU); Robert Ching Kong Cheung, Perth (AU); Ashley Neil Clementi, Perth (AU); Luke Rowan McKenna, Perth (AU); Andrew Wilkins, Perth (AU); Tee Yen Ng, Stirling (AU)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 12/573,980

(22) Filed: Oct. 6, 2009

(65) Prior Publication Data

US 2011/0082927 A1    Apr. 7, 2011

(51) Int. Cl.
*G06F 15/173* (2006.01)

(52) U.S. Cl.
USPC ............ 709/224; 707/737; 707/754; 707/757

(58) Field of Classification Search
USPC ......... 709/220–229, 201–203; 707/600–603, 707/624–635, 692–693, 754–757; 718/100–107; 719/316–318
See application file for complete search history.

(56) References Cited

U.S. PATENT DOCUMENTS

| | | | | |
|---|---|---|---|---|
| 5,710,925 A * | 1/1998 | Leach et al. | ............... | 719/316 |
| 5,805,885 A * | 9/1998 | Leach et al. | ............... | 719/316 |
| 5,822,527 A * | 10/1998 | Post | ............. | 709/206 |
| 6,393,472 B1 * | 5/2002 | Anerousis et al. | ........... | 709/223 |
| 6,519,638 B1 * | 2/2003 | Forman et al. | ............... | 709/224 |
| 6,751,663 B1 * | 6/2004 | Farrell et al. | ............... | 709/224 |
| 6,868,427 B2 * | 3/2005 | Herzog et al. | ............... | 1/1 |
| 6,996,569 B1 * | 2/2006 | Bedell et al. | ............... | 707/737 |
| 7,124,180 B1 * | 10/2006 | Ranous | ............... | 709/224 |
| 7,164,791 B2 | 1/2007 | Cecala | ............... | 382/159 |
| 7,233,692 B2 | 6/2007 | Ii | ............... | 382/159 |
| 7,353,218 B2 | 4/2008 | Aggarwal | ............... | 707/1 |
| 7,379,939 B2 | 5/2008 | Aggarwal | ............... | 707/100 |
| 7,471,832 B2 | 12/2008 | Luo | ............... | 382/224 |
| 7,509,414 B2 * | 3/2009 | Agarwal et al. | ............... | 709/224 |
| 7,512,575 B2 | 3/2009 | Mahesh | ............... | 706/45 |
| 7,523,109 B2 | 4/2009 | Weare | ............... | 707/7 |
| 7,680,822 B1 * | 3/2010 | Vyas et al. | ............... | 707/781 |
| 7,689,616 B2 * | 3/2010 | Peterson | ............... | 707/737 |
| 7,814,194 B2 * | 10/2010 | Hellerstein et al. | ............... | 709/224 |
| 7,831,539 B2 * | 11/2010 | Folting et al. | ............... | 707/600 |
| 8,095,648 B2 * | 1/2012 | MacLeod et al. | ............... | 709/224 |
| 2002/0194305 A1 * | 12/2002 | Sadeghi et al. | ............... | 709/218 |
| 2005/0131932 A1 | 6/2005 | Weare | ............... | 707/6 |
| 2006/0130070 A1 * | 6/2006 | Graf | ............... | 719/318 |
| 2010/0057649 A1 * | 3/2010 | Lee et al. | ............... | 706/12 |
| 2011/0289516 A1 * | 11/2011 | Lloyd et al. | ............... | 719/318 |

* cited by examiner

*Primary Examiner* — Greg C Bengzon

(74) *Attorney, Agent, or Firm* — Van Leeuwen & Van Leeuwen; John D. Flynn

(57) ABSTRACT

An approach is provided that receives a set of tracking data from a monitored activity. The set of tracking data includes name-value pairs. The received set name-value pairs are compared with context masks. Each context mask include one or more name-filter pairs. One of the sets of context masks is selected in response to determining that the incoming name-value pairs matches the mask name-filter pairs of the selected context mask. Name-value pairs are selected based upon the selected context mask. The selected name-value pairs are then stored in an aggregate data store. If the received set of tracking data fails to match at least one of the name-filter pairs then the received set of tracking data is disregarded and none of the name-value pairs are stored in the aggregate data store.

17 Claims, 6 Drawing Sheets

PROCESSING AND PRESENTING MULTI-DIMENSIONED TRANSACTION TRACKING DATA

TECHNICAL FIELD

The present invention relates to an approach for processing and presenting multidimensional transaction tracking data.

BACKGROUND OF THE INVENTION

Network and application monitoring traditionally involves processing large amounts of data into aggregate representations. In traditional solutions the data received from monitored networks and applications only provided the values of the aggregates produced. Traditional systems, in general, therefore provide aggregates that are essentially fixed for a given network or application. As applications change over time, the application source code in traditional systems is changed to provide the monitoring infrastructure with information on new aggregates resulting from the application updates. Changes to source code are not only inefficient but can also introduce unforeseen errors into the systems.

SUMMARY

An approach is provided that receives a set of tracking data from a monitored application. The set of tracking data includes name-value pairs. The received set of name-value pairs are compared with context masks. Each context mask include one or more name-filter pairs. One of the sets of context masks is selected in response to determining that the incoming name-value pairs matches the mask name-filter pairs of the selected context mask. Name-value pairs are selected based upon the selected context mask. The selected name-value pairs are then stored in an aggregate data store. If the received set of tracking data fails to match at least one of the name-filter pairs then the received set of tracking data is disregarded and none of the name-value pairs are stored in the aggregate data store.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
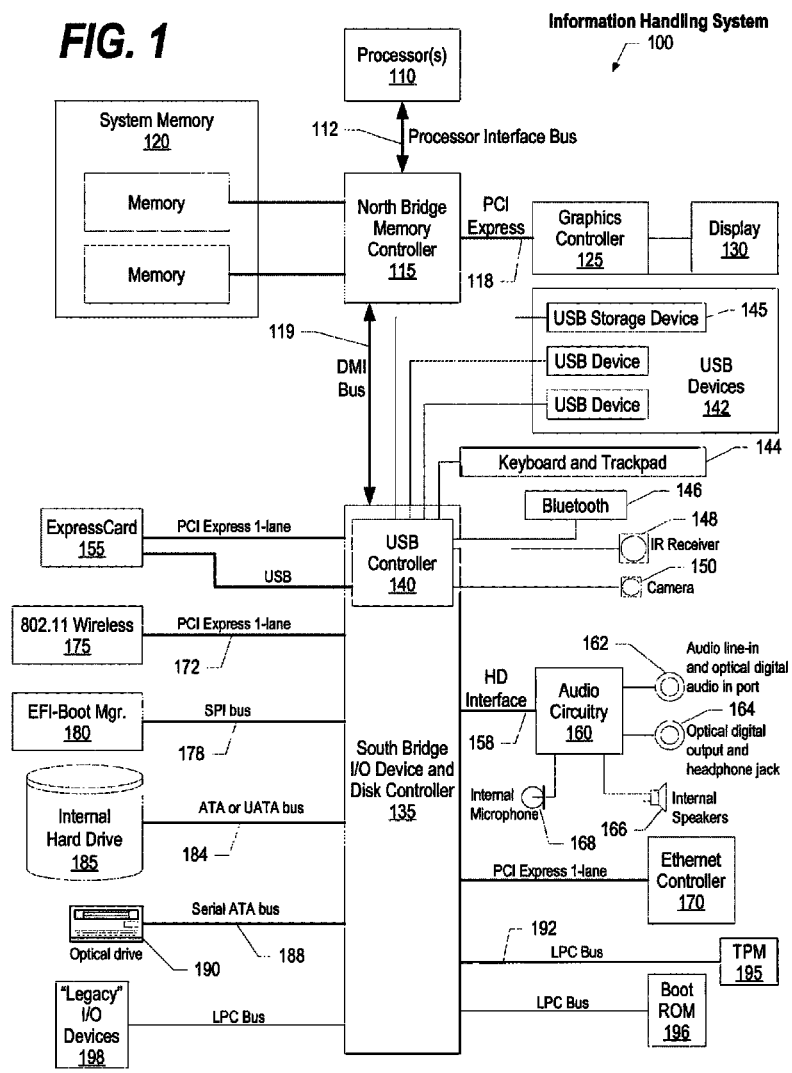
FIG. 1 is a block diagram of a data processing system in which the methods described herein can be implemented.
Figure 2:
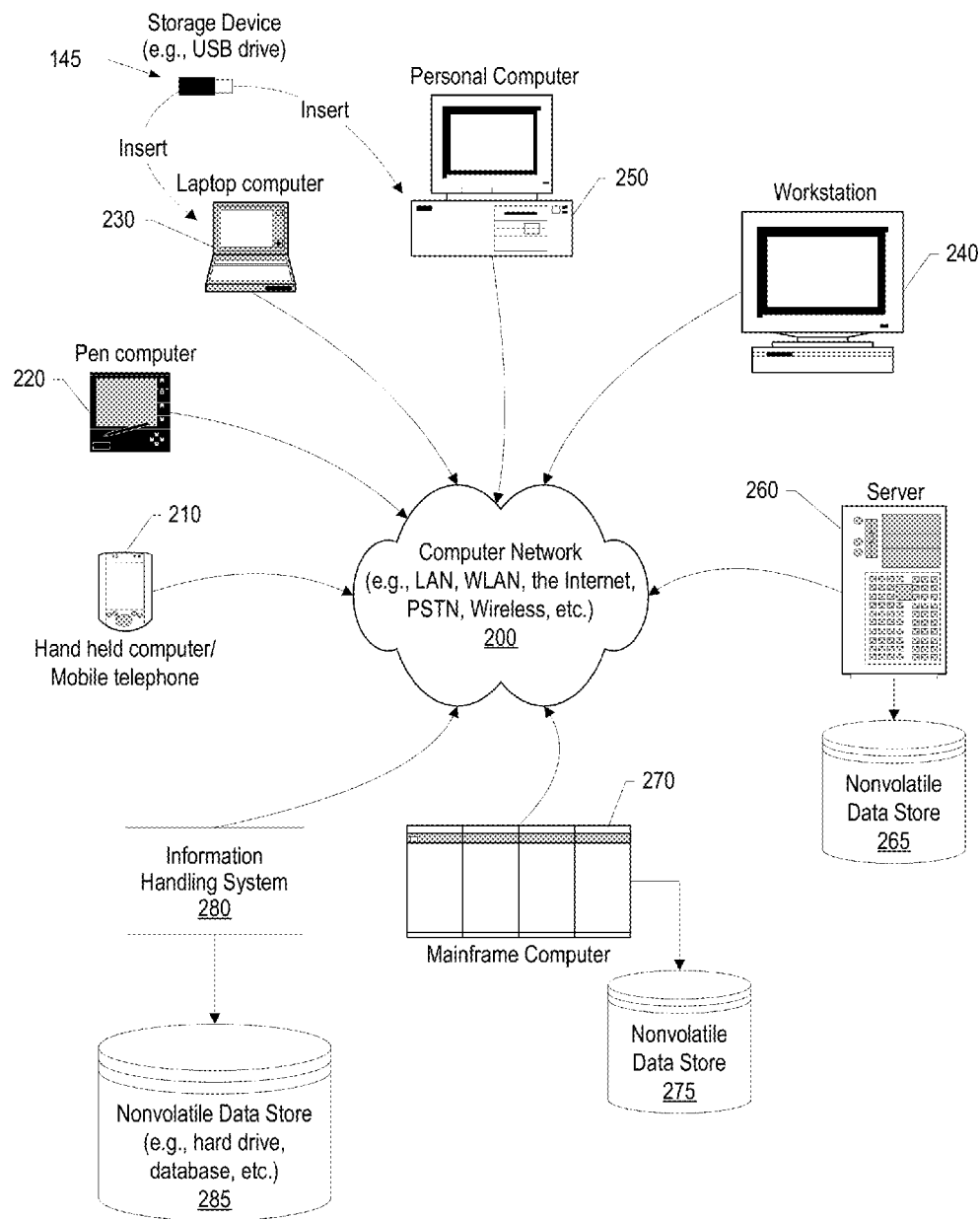
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
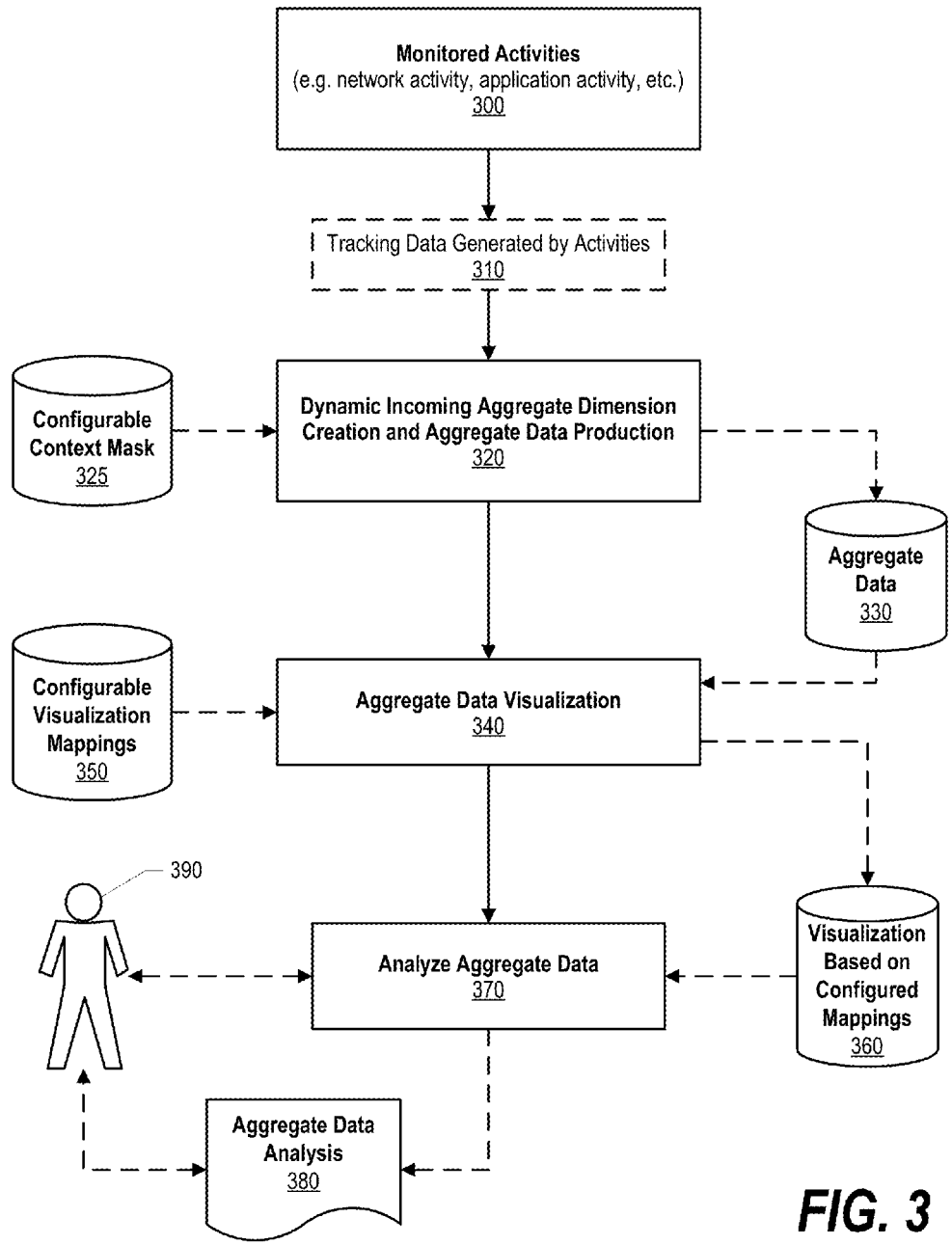
FIG. 3 is a diagram showing a high level breakdown of the interaction between monitored activities, dynamic aggregate dimension creation and aggregate data production, and data visualization and analysis.

FIG. 3 is a diagram showing a high level breakdown of the interaction between monitored activities, dynamic aggregate dimension creation and aggregate data production, and data visualization and analysis. Monitored activities 300 can include network activity, application activity, or the like. When activity occurs, tracking data 310 results. Incoming tracking data includes a variable number of name-value pairs describing the context (or type) of the data point. For example, tracking data points can define two name-value pairs: one with the name "Application", and one with the name "Server". These data points define two dimensions: one which represents the Application from which the data originated, and one which represents the Server from which the data originated.

At step 320, dynamic incoming aggregate dimension creation and aggregate data production are performed against the incoming tracking data. This step uses configurable context masks 325 that define which data is aggregated from the incoming data as well as any conditions the incoming data has to meet in order to match the configurable masks. Multiple configurable context masks can be created. Each context masks includes one or more name-filter pairs. The name in the pair matches against the name in the name-value pair of the incoming tracking data. Aggregates are formed based on a mapping of these name-value pairs. The incoming tracking data will be mapped from M (incoming) dimensions to N (outgoing) dimensions, where M is the number of unique names originating from the tracking data, and N is the number of categories into which the tracking data is divided. We are able to define the outgoing data in a configurable way. The filter provides a condition that the incoming data value needs to match in order to match the mask. Multiple conditions are allowed as well as wildcards. For example, applying a filter "Server=www.*". In this example, only incoming data that passes this filter will be aggregated. Alternatively, we could apply a filter "Server=ftp.*" which would create an entirely different aggregate set using the same input name-value pair set. Data that matches at least one context mask is stored in aggregate data store 330. For example, if we have incoming tracking data (td) where (td1={"Server=www.s1.ibm.com"}, td2={"Server=www.s2.ibm.com"}, td3={Server=www.s2.ibm.com} and td4={"Server=ftp.s1.ibm.com"}. If Context Mask 1="Server=www.", then there will be 2 aggregates; server=www.s1.ibm.com (with td1), server=www.s2.ibm.com(with td2 and td3 in it). Alternatively, if Context Mask 2="Server=ftp", then there will on 1 aggregate (server="ftp.s1.ibm.com" with td4).

At step 340, aggregate data visualization allows a configurable approach to viewing and analyzing aggregate data store 330. Configurable visualization mappings 350 are similar to context masks. However, configurable visualization mappings 350 are used by aggregate data visualization (step 340) to produce visualization 360 that is based on the configured mappings of the aggregate data. The presentation of the aggregates is based on the number of outgoing dimensions. Here, visualized name-filter pairs are used to further aggregate the data stored in aggregate data store 330 to create the visualization. One configurable visualisation mapping can be a hierarchical representation of these dimensions is provided by successively filtering out the finest grain (lowest level) name-value pair set. For example, if the number of outgoing dimensions is four: Servers, Components, Applications, Transactions. Servers and Transactions are the highest and lowest levels in the hierarchy, respectively. The most detailed view would display all four dimensions including Server, Component, Application and Transaction name-value pairs. The next-most detailed view would remove the lowest level in the hierarchy, Transactions in this case, and display only Server, Component and Application name value-pairs. The least detailed view (or highest level in the hierarchy) is based on only one of the name-value pairs, in this case Server. Accordingly visualization mappings 350 can be configured to provide the level of detail desired, as described above.

At step 370, aggregate data is analyzed using visualization as an input. Aggregate data analysis can be performed by an automated process or by user 390. When an automated process is used to analyze the aggregate data, aggregate data analysis 380 is created that can be used and studied by user 390, such as a systems analyst.

Figure 4:
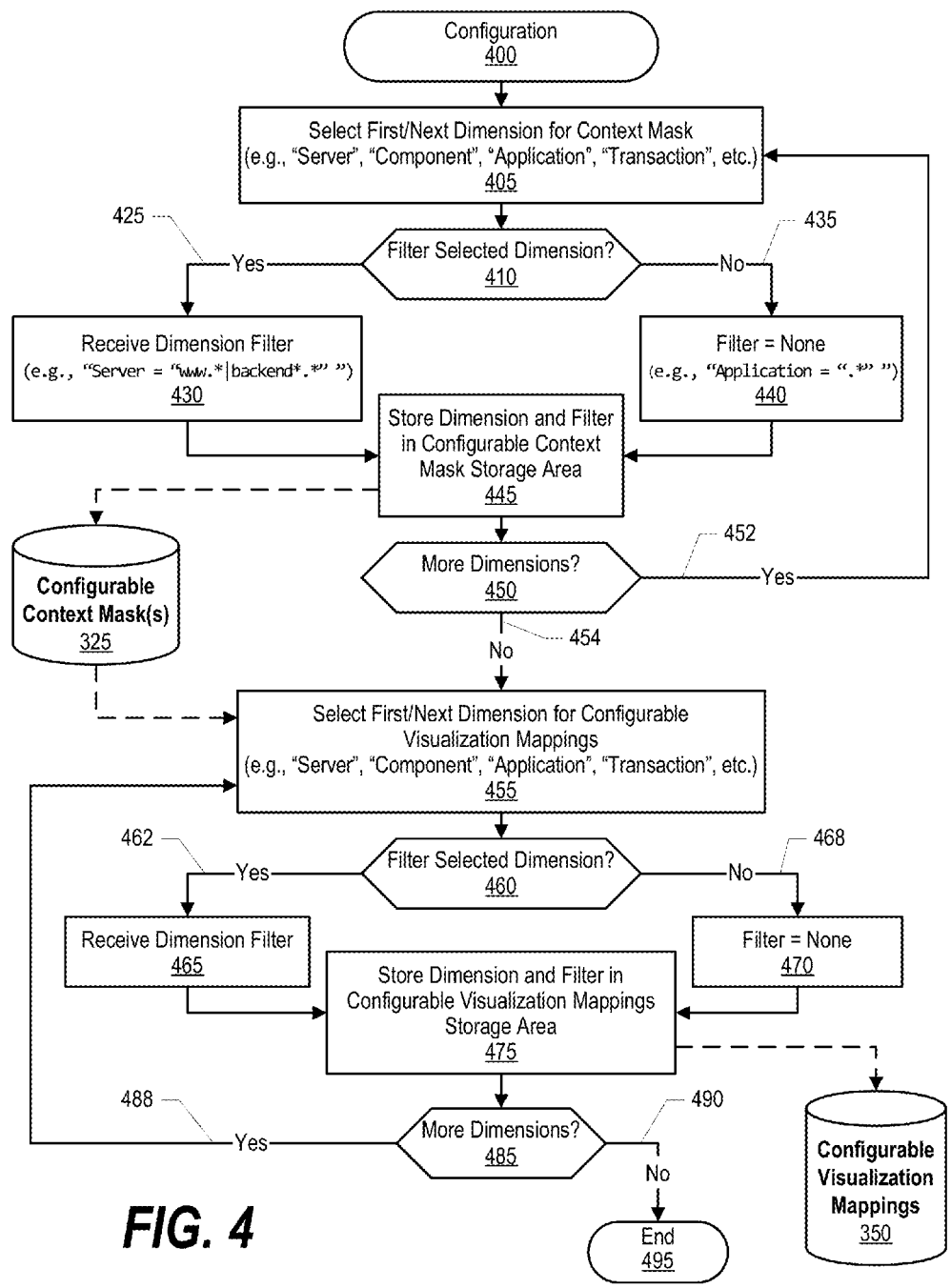
FIG. 4 is a flowchart showing steps taken in configuring both the context masks used in dynamic aggregate dimension creation and aggregate data production as well as visualization mappings used in data visualization.

FIG. 4 is a flowchart showing steps taken in configuring both the context masks used in dynamic aggregate dimension creation and aggregate data production as well as visualization mappings used in data visualization. Processing commences at 400 whereupon, at step 405, the first dimension, or "name", is selected. For example, the dimension (name) could be "Server," "Component," "Application," "Transaction," or any other name that is might be in incoming data traffic received from monitored applications. This provides future flexibility in that if an monitored application is updated and starts transmitting a new type of data, the context mask can simply be configured to include this new type (name) of data as well as any filtering that the user wishes to apply to the data. For example, if a new "widget" type of data is transmitted by a monitored application, the context mask can simply be updated to include the new "widget" name. If, in this mask, we are only interested in "red" widgets, then a condition could be applied, such as "widget=red", whereas if no filtering is requested, the mask can simply be updated to include widgets with any values ("widget=*"). Moreover, context masks can be added, replaced, and deleted as needed by the organization in order to monitor and aggregate tracking data.

A determination is made as to whether the selected dimension (name) is filtered in the context mask (decision 410). If the selected dimension is filtered, then decision 410 branches to "yes" branch 425 whereupon the dimension filter is received at step 430. On the other hand, if the selected dimension (name) is not being filtered, then decision 410 branches to "no" branch 435 whereupon no filter is applied. In one embodiment, a wildcard (e.g., "*") is used to denote that all values pass the filter.

At step 445, the dimension (name) and filter are stored in configurable context mask data store 325 as a name-filter pair. A determination is made as to whether there are more dimensions (names) that are included in this context mask (decision 450). If there are more dimensions (names), then decision 450 branches to "yes" branch 452 which loops back to receive the next dimension (name) selection and associated filter, if any. This looping continues until there are no further dimensions (names) to compare in the context mask, at which point decision 450 branches to "no" branch 454. The above process can be performed multiple times in order to create multiple context masks. Each of the configured context masks are stored in context masks data store 325 and each can include any number of dimensions (names) and corresponding filters.

At step 455 the creation of the visualization mappings commences with the selection of the first dimension (name) to use in the visualization mapping. In one embodiment, the dimensions (names) available in context masks data store 325 are used as the list of possible dimensions (names) that can be selected. Similar to the context mask processing, a determination is made as to whether the user wishes to filter the selected dimension (name) in the visualization mapping (decision 460). If filtering is desired, then decision 460 branches to "yes" branch 462 whereupon, at step 465, the filter is received similar to the filters described above. Likewise, if filtering is not desired, then decision 460 branches to "no" branch 468 whereupon at step 470 no filtering is applied to the selected dimension (name). Wildcard characters can also be used in transaction mapping filters as previously described for context mask filters.

At step 475, the dimension (name) and filter corresponding to the filter are stored in configurable visualization mappings data store 350 as a visualized name-value pair for subsequent use in visualizing aggregate data. A determination is made as to whether there are more dimensions (names) to include in this visualization mapping (decision 485). If there are more dimensions (names) to include in this visualization mapping, then decision 485 branches to "yes" branch 488 which loops back to receive the users next dimension (name) selection and any filter corresponding to the name. This looping continues until there are no more dimensions (names) to include in the visualization mapping, at which point decision 485 branches to "no" branch 490 and configuration processing ends at 495.

Figure 5:
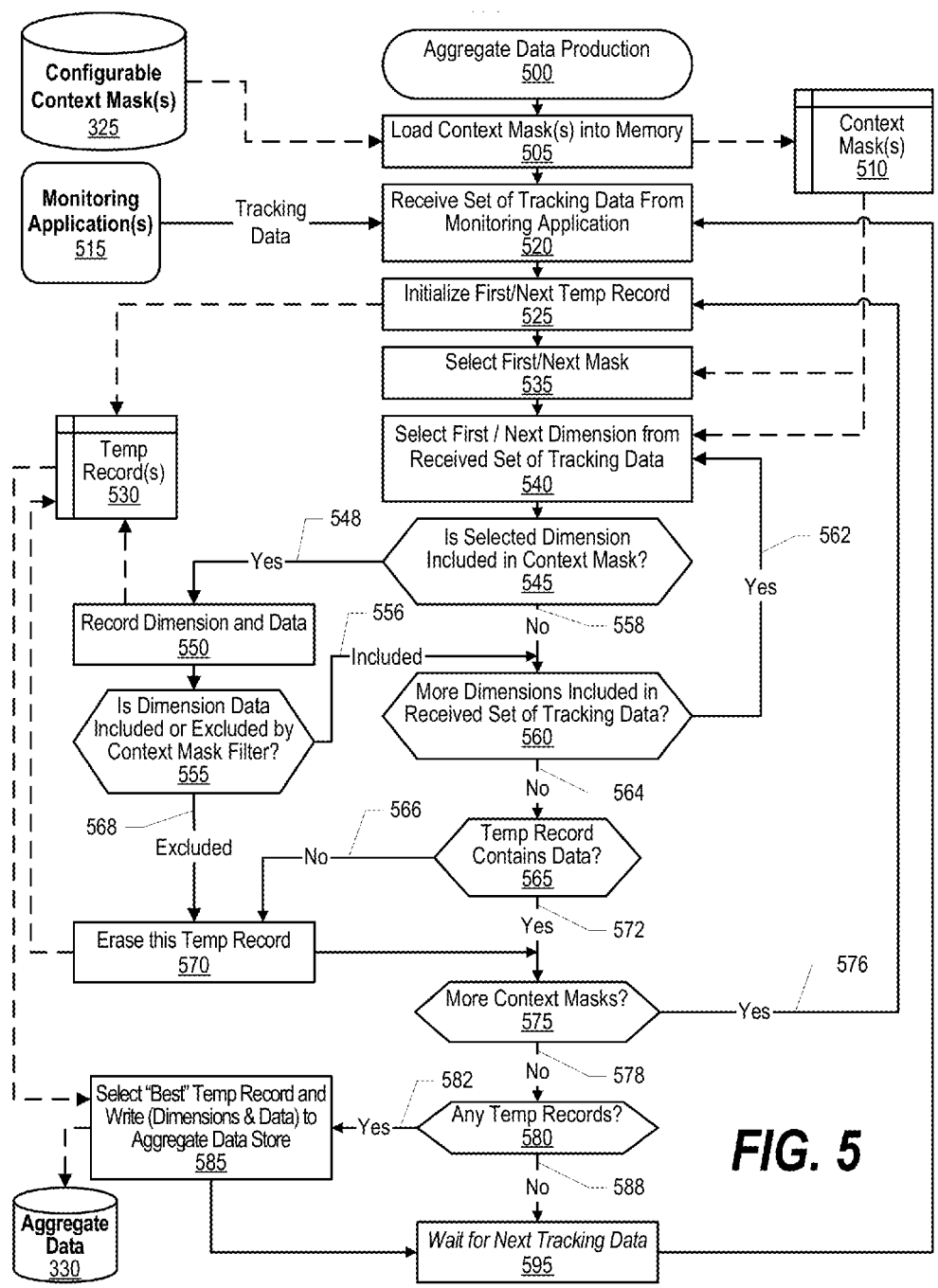
FIG. 5 is a flowchart showing steps used in dynamic aggregate dimension creation and aggregate data production.

FIG. 5 is a flowchart showing steps used in dynamic aggregate dimension creation and aggregate data production. Processing commences at 500 whereupon at step 505 the context mask, or masks, that have been configured are retrieved from context masks data store 325 and loaded in context masks memory area 510. At step 520, tracking data is received from one of the monitored applications 515. Tracking data is sent as name-value pairs (e.g., "Server":"www01" where the name (dimension) is "Server" and the value of the name is "www01").

At step 525 a first temporary record is initialized in temporary records memory area 530. These temporary records are used to store name-value pairs that match context mask name-filter pairs. The temporary storage area is used because multiple context mask name-filter pairs might match the incoming data name-value pairs. When this happens, as will be explained below, in one embodiment one of the temporary records is used to update the aggregate data store. In another embodiment, multiple temporary records can be used to update the aggregate data store so that one incoming set of tracking data can result in multiple new records to the aggregate data store.

At step 535 the first context mask is selected from the set of context masks stored in memory area 510. As previously described, each of the context masks includes one or more name-filter pairs. A simple context mask might only include a single dimension (name), such as "Server=ftp.*". With this mask, tracking data with server value that begins with "ftp" is included. In one embodiment, the names included in the context mask name-filter pairs determines which data is included in the aggregate data store. So, for this example, only the name of the ftp server would be included. In another embodiment, all or a subset of the data can be included when a match occurs regardless of the names included in the context mask.

At step 540, the first dimension (name) is selected from the received set of tracking data. A determination is made as to whether this dimension (name) is included in the selected context mask (decision 545). If the dimension (name) in the tracking data name-value pair matches a name in one of the context mask's name-filter pairs, then decision 545 branches to "yes" branch 548 whereupon, at step 550, the dimension (name) and the value are stored in the initialized temporary record and stored in temporary record memory area 530. A determination is made as to whether the data is included or excluded based upon any filter that corresponds to the selected dimension (name) (decision 555). For example, if the selected dimension (name) is "Server" and the selected mask has a filter of "Server=ftp.*" then the incoming tracking data name-value pair are compared to the filter. So, if the name-value pair is "Server=ftp.ibm.com" then the data, using the example, would be included and decision 555 would branch to included branch 556. On the other hand, if the name-value pair is "Server=www.ibm.com" then the data would be excluded and decision 555 would branch to excluded branch 558 and the temporary record would be erased at step 570.

Returning to decision 545, if the selected dimension (name) is not included in the context mask, then decision 545 branches to "no" branch 558. If either the name-value pair is included (decision 555 branching to "included" branch 556) or if the dimension (name) is not included in the context mask, then a determination is made as to whether there are more dimensions (names) included in the received set of tracking data (decision 560). If there are more dimensions (names) in the tracking data, then decision 560 branches to "yes" branch 562 which loops back to process the next dimension (name) from the incoming tracking data and compare it to the dimensions (names) included in the context mask. This looping continues until all of the dimensions (names) included in the incoming tracking data have been processed, at which time decision 560 branches to "no" branch 564.

A determination is made as to whether the temporary record used to store name-value pairs of the incoming data that match name-filter pairs of the selected context mask contains any data (decision 565). If none of the dimensions (names) of the incoming name-value pairs match any of the dimensions (names) of the selected context mask, then the temporary record will not contain any data. If the temporary record does not contain any data, then decision 565 branches to "no" branch 566 whereupon, at step 570, the temporary record is erased. On the other hand, if the temporary record contains some name-value pairs reflecting matches with the selected context mask, then decision 565 branches to "yes" branch 572 and the temporary record is retained.

A determination is made as to whether there are any more context masks to process (decision 575). As previously described, multiple context masks can be configured to provide various levels of data aggregation. If there are more context masks to process against the incoming set of tracking data, then decision 575 branches to "yes" branch 576 which loops back to initialize a new temporary record, select the next context mask from context masks memory area 510 and process the incoming set of tracking data against this newly selected context mask as described above. This looping continues until all of the configured context masks have been processed, at which point decision 575 branches to "no" branch 578.

A determination is made as to whether there are any temporary records in temporary records memory area 530 (decision 580). If there are one or more temporary records, then decision 580 branches to "yes" branch 582 whereupon, at step 585, the "best" temporary record is aggregated by writing the name-value pairs included in the temporary record to aggregate data store 330. Which temporary record is the "best" temporary record can be different based on the implementation. For example, a policy can be established to aggregate using the mask that matched against the most dimensions (names) of the incoming name-value pairs. A different policy could be established to aggregate using the mask that found a first match (i.e. the first temporary record written). Other algorithms can be established by the user to select the temporary record to use to aggregate the data. In an alternative embodiment, multiple temporary records are written to the aggregate data store. Returning to decision 580, if there are no temporary records in temporary record memory area 530, then decision 580 branches to "no" branch 588 without writing any data to aggregate data store 330.

At step 595, processing waits for the next set of tracking data to be received from a monitored activity. When the next set of tracking data arrives, processing loops back to step 520 and the new set of tracking data (name-value pairs) is processed as described above. As will be appreciated by those skilled in the art, tracking data can be received and processed in parallel so that multiple parallel processes can simultaneously be performing the steps outlined and described in FIG. 5.

Example of Processing Performed by FIG. 5 Aggregate Data Production

The following presents an example as to how the processes outlined and described in FIG. 5 ultimately work to aggregate incoming tracking data using flexible context masks. In this example, incoming tracking data are noted as "tdn" (e.g., td1, td2, etc.), and context masks are noted as "cmn" (e.g., cm1, cm2, etc.).

In this example, assume:
td1=
  Context={Server="www.s1.ibm.com"}
  (Metrics) Response time=30 ms.
td2=
  Context={Server="www.s2.ibm.com"}
  (Metrics) Response time=40 ms.
td3=
  Context={Server="www.s2.ibm.com"}
  (Metrics) Response time=30 ms.
td4=
  Context={Server="ftp.s1.ibm.com"}

(Metrics) Response time=30 ms.
cm1=
  Server="www.*"
The order of the events with above data will then be as follows—
cm1 gets loaded into memory (step 505 in FIG. 5)
td1 arrives from monitoring application (steps 515 to 520 in FIG. 5))
  td1 is compared with cm1 (to see if td1 "passes" the context mask)
    td1's first dimension is "Server", which is also in CM1, so answer to (decision 545 in FIG. 5) is yes
    does td1's Server value included or excluded by the CM1's filter?=>
      INCLUDED, www.* can match www.s1.ibm.com (steps 555 to 560 in FIG. 5),
      since it is included "temp record" (530 in FIG. 5) is set to "Server=www.s1.ibm.com" to indicate dimension "server" passes the filter and the value that it passed the filter with is www.s1.ibm.com (this because multiple values can pass the same filter if you use things like wildcards.)
    no more dimensions, (steps 560 to 565 in FIG. 5)
    yes, contains data (step 565 to 575 in FIG. 5)
  no more context masks, (decision 575 in FIG. 5)
  YES to temp record, (decision 580 in FIG. 5)
  (step 585 in FIG. 5)—As the result of above, td1 will now be written to the aggregate with the label (Server=www.s1.ibm.com").
    If the aggregate store (330) does not already contain the aggregate with the label (Server=www.s1.ibm.com) a new aggregate with be created, if not the existing aggregate will be updated.
    For example, in one implementation, the "metrics" of the new aggregate will now have—
    Count=1 (first tracking data to enter this aggregate)
    Response time average of 30 ms.
  Now td1 is completed, so we wait for next td to arrive (step 595)
td2 arrives. It will pass through the mask with the value—
  Server=www.s2.ibm.com
  So a new aggregate with be created in 330,
  its label will be Server=www.s2.ibm.com
  its metric will be
    Count=1
    Average response time=40 ms
td3 arrives. It will pass through cm1 with the values—
  Server=www.s2.ibm.com
  At this stage, the system tries to put the temp record into aggregate store. However, there is already an aggregate in the store with the same label (server=www.s2.ibm.com, previously created as the result of processing td2)
    So instead of creating a new record in aggregate store, the existing record will be updated, e.g.:
    Aggregate label: Server=www.s2.ibm.com
    Metrics:
      Count=2
      Average response time=35 ms ((40 ms+30 ms)/2)
td4 arrives,
  ftp.s1.ibm.com does not passes through context mask CM1, so it is discarded.
The example above can be further extended. For example, imagine that the system is monitoring two web servers (www.s1.ibm.com and www.s2.ibm.com), in the space of say 5 mins, you might have several thousand tracking points, and after that period, our aggregates might look like the following—
  Aggregate 1
    label=Server=www.s1.ibm.com
    Metrics
      Count=483
      Response time average=32.5 ms
  Aggregate 2
    label=Server=www.s2.ibm.com
    Metrics
      Count=630
      Response time average=42 ms Now imagine a third server (www.s3.ibm.com) is bought online. Previously, traditional monitoring applications would need to be configured to start monitoring it. But using the techniques and processes outlined in FIGS. 3-6 and corresponding text, a third aggregate will be automatically created with the label—"Server=www.s3.ibm.com." This is performed without user intervention based on the flexibility of the context mask that is being used.

Figure 6:
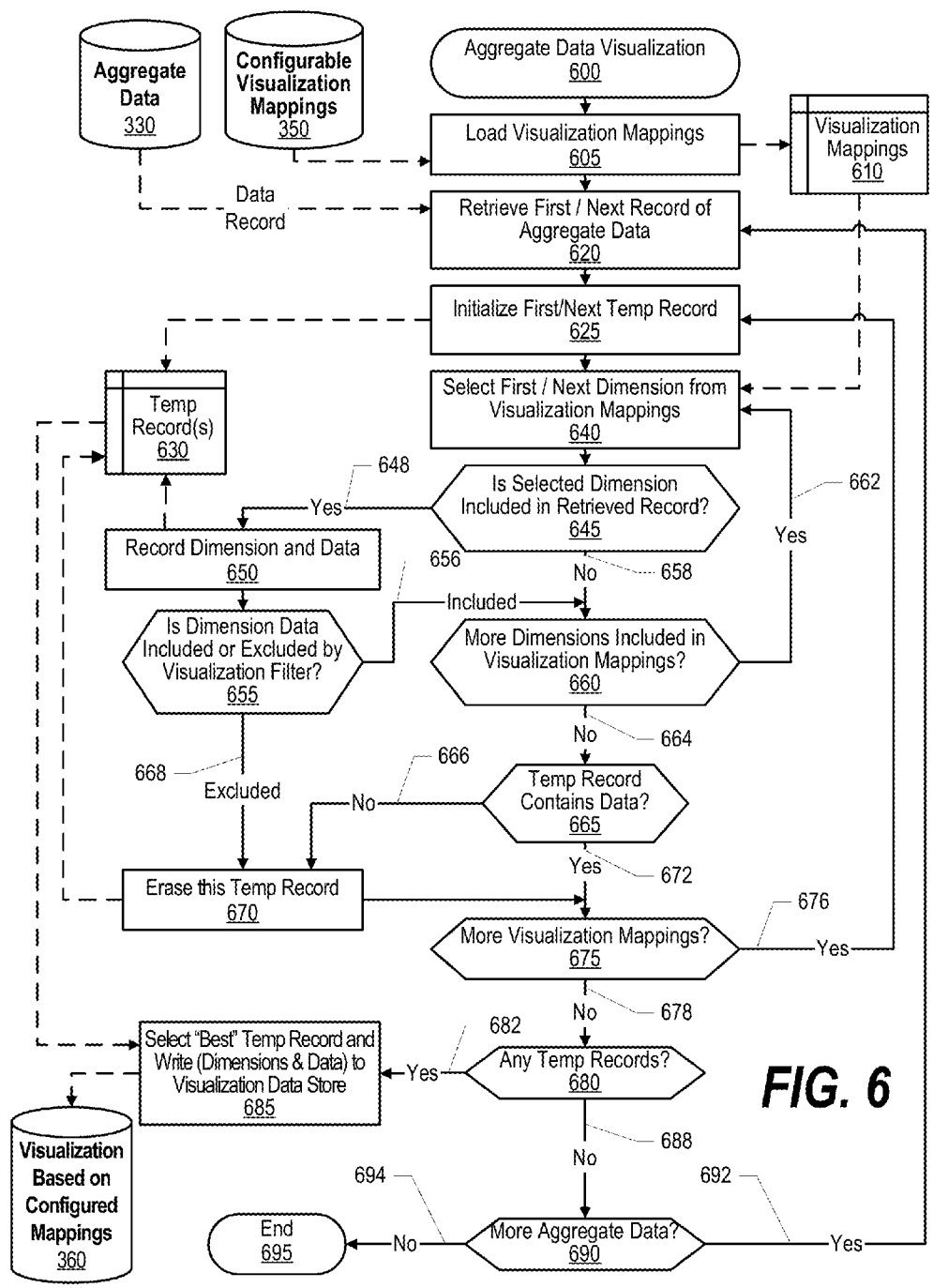
FIG. 6 is a flowchart showing steps taken in performing aggregate data visualization.

FIG. 6 is a flowchart showing steps taken in performing aggregate data visualization. FIG. 6 is relatively similar to FIG. 5, however while FIG. 5 processed an incoming set of tracking data from a monitored activity (e.g., an application, network etc.) to aggregate data and store it in aggregate data store 330, FIG. 6 includes steps to process and analyze the aggregate data store.

Processing commences at 600 whereupon, at step 605, visualization mappings are retrieved from visualization mappings data store 350 and stored in visualization mappings memory area 610. At step 620 the first record of aggregate data is retrieved. As described in FIG. 5, the records included in aggregate data store 330 include name-value pairs. At step 625, the first temporary record is initialized in temporary records memory are 630. At step 640, the first dimension (name) is retrieved from visualization mappings 610.

A determination is made as to whether the selected dimension (name) from the visualization mappings is included in the retrieved record (i.e. is one of the names in the name-value pairs in the retrieved record) (decision 645). If the selected dimension (name) from the visualization mappings is included in the retrieved record, then decision 645 branches to "yes" branch whereupon, at step 650, the dimension (name) and value (the name-value pair) are stored in the initialized temporary record in temporary record memory area 630. A determination is then made as to whether the data is excluded or included based upon the visualization filter (decision 655). If the data is excluded, then decision 655 branches to "excluded" branch 668 whereupon, at step 670, the temporary record is erased. On the other hand, if the record is included, then decision 655 branches to "included" branch 656. If either the record is included (decision 655 branching to "included" branch 656) or if the dimension (name) was not included in the data record (decision 645 branching to "no" branch 658) then a determination is made as to whether there are more dimensions (names) included in the visualization mappings (decision 660). If there are more dimensions (names) included in the visualization mappings, then decision 660 branches to "yes" branch 662 which loops back to select the next dimension (name) from visualization mappings 610 and process it as described above. This looping continues until there are no more dimensions (names) to process, at which point decision 660 branches to "no" branch 664.

A determination is made as to whether the temporary record includes any data (decision 665). If the temporary record does not include any data, then decision 665 branches to "no" branch 666 whereupon, at step 670, the temporary record is deleted. On the other hand, if the temporary record does include data, then decision 665 branches to "yes" branch 672 whereupon a determination is made as to whether there are more visualization mappings to process (decision 675). If there are more visualization mappings to process, then decision 675 branches to "yes" branch 676 which loops back to initialize the next temporary record and select the next visualization mapping for processing. This looping continues until all visualization mappings have been processed at which point decision 675 branches to "no" branch 678.

A determination is made as to whether there are any temporary records resulting from the processing of the first record of aggregate data store 330 (decision 680). If there are records, then decision 680 branches to "yes" branch 682 whereupon, at step 685, the "best" temporary record is selected and stored in visualization data store 360. As described with respect to FIG. 5, the "best" record can be selected using a variety of approaches or policies. Also, in an alternative embodiment, more than one of the temporary records can be written to visualization data store 360. Returning to decision 680, if there are no temporary records, then decision 680 branches to "no" branch 688 bypassing step 685 and no visualization data will be written corresponding to this record retrieved from aggregate data store 330.

A determination is made as to whether there are more records to process from aggregate data store 330 (decision 690). If there are more records to process, then decision 690 branches to "yes" branch 692 which loops back to step 620 to retrieve the next record from aggregate data store 330 and process it as described above. This looping continues until all records from aggregate data store 330 have been processed, at which point decision 690 branches to "no" branch 694 and processing ends at 695.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
    receiving a set of tracking data from a monitored activity, wherein the set of tracking data includes a plurality of name-value pairs, and wherein the plurality of name-value pairs includes at least a first name-value pair corresponding to an application that is a source of the tracking data and a second name-value pair corresponding to a server that is a source of the tracking data;
    retrieving one or more sets of context masks from a configurable context mask storage area, wherein each of the sets of context masks include one or more name-filter pairs, and wherein the sets of context masks are configured to include a first set of name-filter pairs;
    comparing, by one or more processors, the received set of name-value pairs with the one or more sets of retrieved context masks;
    selecting, by the one or more processors, one of the sets of context masks in response to determining that the incoming name-value pairs match the mask name-filter pairs of the selected context mask;
    selecting, by the one or more processors, one or more of the name-value pairs, the selected name-value pairs being based upon the selected context mask;
    storing the selected one or more name-value pairs in an aggregate data store;
    disregarding the received set of tracking data in response to determining that the name-value pairs fail to match at least one of the name-filter pairs; and
    updating the sets of context masks to include a second set of name-filter pairs, wherein the comparing is subsequently performed using the updated sets of context masks, and wherein the updating further comprises storing the updated sets of context masks in the configurable context mask storage area.

2. The method of claim 1 further comprising:
    including a wildcard character in a filter portion of at least one of the name-filter pairs.

3. The method of claim 1 further comprising:
    ordering the sets of context masks based on a user preference; and
    comparing the name-filter pairs of the context masks as ordered with the name-value pairs of the set of tracking data, wherein the selection of one of the sets of context masks is the first context mask with name-filter pairs that matches the name-value pairs.

4. The method of claim 1 further comprising:
    identifying a set of context masks, the identified set of context masks each having one or more name-filter pairs that each match the name-value pairs of the tracking data; and selecting one of the identified sets of context masks as the selected context mask based on a predefined algorithm.

5. The method of claim 1 further comprising:
receiving a first plurality of sets of tracking data, including the set of tracking data, and storing a plurality of name-value pairs in the aggregate data store wherein the stored name-value pairs correspond to a second plurality of sets of tracking data that matched at least one of the name-filter pairs of at least one of the context masks;
comparing the plurality of name-value pairs stored in the aggregate data store with one or more sets of visualization mappings, wherein each of the sets of visualization mappings include one or more visualized name-filter pairs;
disregarding a first plurality of name-value pairs from the aggregate data store in response to determining that the name-value pairs fail to match at least one of the visualized name-filter pairs;
selecting a second plurality of name-value pairs from the aggregate data store in response to determining that the name-value pairs from the aggregate data store match the visualized name-filter pairs of at least one of the visualization mappings;
storing the second plurality of name-value pairs in a visualization data store.

6. The method of claim 5 further comprising:
analyzing the name-value pairs from the visualization data store using an aggregate data analysis routine, the analyzing resulting in an aggregate data analysis; and
displaying the aggregate data analysis to a user.

7. An information handling system comprising:
one or more processors;
a memory accessible by at least one of the processors;
a nonvolatile storage medium accessible by at least one of the processors;
a set of instructions stored in the memory and executed by at least one of the processors in order to perform actions of:
    receiving a set of tracking data from a monitored activity, wherein the set of tracking data includes a plurality of name-value pairs, and wherein the plurality of name-value pairs includes at least a first name-value pair corresponding to an application that is a source of the tracking data and a second name-value pair corresponding to a server that is a source of the tracking data;
    retrieving one or more sets of context masks from a configurable context mask storage area in the memory, wherein each of the sets of context masks include one or more name-filter pairs, and wherein the sets of context masks are configured to include a first set of name-filter pairs;
    comparing the received set of name-value pairs with the one or more sets of retrieved context masks;
    selecting one of the sets of context masks in response to determining that the incoming name-value pairs match the mask name-filter pairs of the selected context mask;
    selecting one or more of the name-value pairs, the selected name-value pairs being based upon the selected context mask;
    storing the selected one or more name-value pairs in an aggregate data store on the nonvolatile storage medium;
    disregarding the received set of tracking data in response to determining that the name-value pairs fail to match at least one of the name-filter pairs; and
    updating the sets of context masks to include a second set of name-filter pairs, wherein the comparing is subsequently performed using the updated sets of context masks, and wherein the updating further comprises storing the updated sets of context masks in the configurable context mask storage area.

8. The information handling system of claim 7 wherein the actions further comprise:
including a wildcard character in a filter portion of at least one of the name-filter pairs.

9. The information handling system of claim 7 wherein the actions further comprise:
ordering the sets of context masks based on a user preference; and
comparing the name-filter pairs of the context masks as ordered with the name-value pairs of the set of tracking data, wherein the selection of one of the sets of context masks is the first context mask with name-filter pairs that matches the name-value pairs.

10. The information handling system of claim 7 wherein the actions further comprise:
identifying a set of context masks, the identified set of context masks each having one or more name-filter pairs that each match the name-value pairs of the tracking data; and
selecting one of the identified sets of context masks as the selected context mask based on a predefined algorithm.

11. The information handling system of claim 7 wherein the actions further comprise:
receiving a first plurality of sets of tracking data, including the set of tracking data, and storing a plurality of name-value pairs in the aggregate data store wherein the stored name-value pairs correspond to a second plurality of sets of tracking data that matched at least one of the name-filter pairs of at least one of the context masks;
comparing the plurality of name-value pairs stored in the aggregate data store with one or more sets of visualization mappings, wherein each of the sets of visualization mappings include one or more visualized name-filter pairs;
disregarding a first plurality of name-value pairs from the aggregate data store in response to determining that the name-value pairs fail to match at least one of the visualized name-filter pairs;
selecting a second plurality of name-value pairs from the aggregate data store in response to determining that the name-value pairs from the aggregate data store match the visualized name-filter pairs of at least one of the visualization mappings;
storing the second plurality of name-value pairs in a visualization data store.

12. A non-transitory computer readable storage medium with functional descriptive material stored thereon, that, when executed by an information handling system, causes the information handling system to perform actions comprising:
receiving a set of tracking data from a monitored activity, wherein the set of tracking data includes a plurality of name-value pairs, and wherein the plurality of name-value pairs includes at least a first name-value pair corresponding to an application that is a source of the tracking data and a second name-value pair corresponding to a server that is a source of the tracking data;
retrieving one or more sets of context masks from a configurable context mask storage area, wherein each of the sets of context masks include one or more name-filter pairs, and wherein the sets of context masks are configured to include a first set of name-filter pairs;

comparing the received set of name-value pairs with the one or more sets of retrieved context masks;

selecting one of the sets of context masks in response to determining that the incoming name-value pairs match the mask name-filter pairs of the selected context mask;

selecting one or more of the name-value pairs, the selected name-value pairs being based upon the selected context mask;

storing the selected one or more name-value pairs in an aggregate data store;

disregarding the received set of tracking data in response to determining that the name-value pairs fail to match at least one of the name-filter pairs; and updating the sets of context masks to include a second set of name-filter pairs, wherein the comparing is subsequently performed using the updated sets of context masks, and wherein the updating further comprises storing the updated sets of context masks in the configurable context mask storage area.

13. The computer readable storage medium of claim 12 wherein the actions further comprise:

including a wildcard character in a filter portion of at least one of the name-filter pairs.

14. The computer readable storage medium of claim 12 wherein the actions further comprise:

ordering the sets of context masks based on a user preference; and comparing the name-filter pairs of the context masks as ordered with the name-value pairs of the set of tracking data, wherein the selection of one of the sets of context masks is the first context mask with name-filter pairs that matches the name-value pairs.

15. The computer readable storage medium of claim 12 wherein the actions further comprise:

identifying a set of context masks, the identified set of context masks each having one or more name-filter pairs that each match the name-value pairs of the tracking data; and selecting one of the identified sets of context masks as the selected context mask based on a predefined algorithm.

16. The computer readable storage medium of claim 12 wherein the actions further comprise:

receiving a first plurality of sets of tracking data, including the set of tracking data, and storing a plurality of name-value pairs in the aggregate data store wherein the stored name-value pairs correspond to a second plurality of sets of tracking data that matched at least one of the name-filter pairs of at least one of the context masks;

comparing the plurality of name-value pairs stored in the aggregate data store with one or more sets of visualization mappings, wherein each of the sets of visualization mappings include one or more visualized name-filter pairs;

disregarding a first plurality of name-value pairs from the aggregate data store in response to determining that the name-value pairs fail to match at least one of the visualized name-filter pairs;

selecting a second plurality of name-value pairs from the aggregate data store in response to determining that the name-value pairs from the aggregate data store match the visualized name-filter pairs of at least one of the visualization mappings;

storing the second plurality of name-value pairs in a visualization data store.

17. The computer readable storage medium of claim 16 wherein the actions further comprise:

analyzing the name-value pairs from the visualization data store using an aggregate data analysis routine, the analyzing resulting in an aggregate data analysis; and displaying the aggregate data analysis to a user.

* * * * *